(12) United States Patent
Fu

(10) Patent No.: US 12,440,143 B2
(45) Date of Patent: Oct. 14, 2025

(54) SIGNAL ACQUISITION CIRCUIT AND PHYSIOLOGICAL DETECTION APPARATUS

(71) Applicant: BOE TECHNOLOGY GROUP CO., LTD., Beijing (CN)

(72) Inventor: Bao Fu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 787 days.

(21) Appl. No.: 17/772,253

(22) PCT Filed: Jun. 17, 2021

(86) PCT No.: PCT/CN2021/100598
§ 371 (c)(1),
(2) Date: Apr. 27, 2022

(87) PCT Pub. No.: WO2022/022145
PCT Pub. Date: Feb. 3, 2022

(65) Prior Publication Data
US 2022/0369987 A1 Nov. 24, 2022

(30) Foreign Application Priority Data
Jul. 30, 2020 (CN) .......................... 202010754068.4

(51) Int. Cl.
*A61B 5/308* (2021.01)
*A61B 5/00* (2006.01)
(Continued)

(52) U.S. Cl.
CPC ............ *A61B 5/308* (2021.01); *A61B 5/0205* (2013.01); *A61B 5/282* (2021.01); *A61B 5/7203* (2013.01); *A61B 5/08* (2013.01); *A61B 5/318* (2021.01)

(58) Field of Classification Search
CPC ....... A61B 5/308; A61B 5/0205; A61B 5/282; A61B 5/7203; A61B 5/08; A61B 5/318
See application file for complete search history.

(56) References Cited

U.S. PATENT DOCUMENTS

| 2007/0087703 A1* | 4/2007 | Li | A61B 5/30 |
| | | | 455/114.2 |
| 2010/0191509 A1* | 7/2010 | Li | A61B 5/30 |
| | | | 600/509 |

(Continued)

FOREIGN PATENT DOCUMENTS

| CN | 103054571 A | 4/2013 |
| CN | 103908241 A | 7/2014 |

(Continued)

OTHER PUBLICATIONS

China Patent Office, First Office Action issued Aug. 30, 2023 for application No. CN202010754068.4.

*Primary Examiner* — Seokjin Kim
(74) *Attorney, Agent, or Firm* — HOUTTEMAN LAW LLC

(57) ABSTRACT

A signal acquisition circuit is provided in the present disclosure. The signal acquisition circuit includes a signal acquisition electrode, wherein the at least one signal acquisition electrode is provided with a signal acquisition branch circuit, and the signal acquisition electrode is provided with a feedback network branch circuit. A first terminal of the signal acquisition branch circuit is electrically connected to the signal acquisition electrode, a second terminal of the signal acquisition branch circuit is electrically connected to a signal input terminal of a signal processing module. A first terminal of the feedback network branch circuit is electrically connected to the signal acquisition electrode, a second (Continued)

terminal of the feedback network branch circuit is electrically connected to a Driven-Right-Leg Circuit.

13 Claims, 3 Drawing Sheets

(51) Int. Cl.
  *A61B 5/0205*    (2006.01)
  *A61B 5/282*     (2021.01)
  *A61B 5/08*      (2006.01)
  *A61B 5/318*     (2021.01)

(56) References Cited

U.S. PATENT DOCUMENTS

| | | | | |
|---|---|---|---|---|
| 2011/0313305 A1* | 12/2011 | Rantala | ............. | A61B 5/308 |
| | | | | 600/509 |
| 2016/0228024 A1* | 8/2016 | Batzer | ............. | G01R 19/10 |
| 2018/0168458 A1* | 6/2018 | Pekander | ............. | A61B 5/086 |
| 2020/0163574 A1* | 5/2020 | Chen | ............. | A61B 5/7203 |
| 2020/0229724 A1* | 7/2020 | Gupta | ............. | A61B 5/14551 |
| 2020/0297282 A1* | 9/2020 | Batzer | ............. | A61B 5/318 |
| 2021/0212587 A1* | 7/2021 | Warner | ............. | A61B 5/305 |
| 2021/0244337 A1* | 8/2021 | Liang | ............. | A61B 5/332 |
| 2021/0333233 A1* | 10/2021 | Shirai | ............. | G01N 27/4145 |

FOREIGN PATENT DOCUMENTS

| | | | | |
|---|---|---|---|---|
| CN | 104000584 A | | 8/2014 | |
| CN | 105342601 A | | 2/2016 | |
| CN | 106411420 A | | 2/2017 | |
| CN | 106419894 A | * | 2/2017 | ............. A61B 5/04 |
| CN | 107666300 A | | 2/2018 | |
| CN | 207220807 U | | 4/2018 | |
| CN | 207516762 U | | 6/2018 | |
| CN | 207603577 U | | 7/2018 | |
| CN | 110327038 A | | 10/2019 | |
| CN | 110448374 A | | 11/2019 | |
| CN | 209676213 U | | 11/2019 | |
| CN | 110742598 A | | 2/2020 | |
| CN | 110786848 A | | 2/2020 | |
| CN | 113796872 A | * | 12/2021 | ............. A61B 5/256 |

* cited by examiner

SIGNAL ACQUISITION CIRCUIT AND PHYSIOLOGICAL DETECTION APPARATUS

TECHNICAL FIELD

The present disclosure relates to the field of medical detection technology, and in particular, to a signal acquisition circuit and a physiological detection apparatus.

BACKGROUND

In general electrocardiographic monitoring, an electrocardiographic detection apparatus, as a necessary apparatus required for monitoring diseases such as arrhythmia, myocardial ischemia and early coronary heart disease, can effectively monitor important indexes of a patient, such as a heart rate and a cardiac rhythm. The electrocardiographic detection apparatus typically includes at least one signal acquisition electrode configured to acquire an electrocardiosignal and transmit the acquired electrocardiosignal to a signal processing module, and the signal processing module processes the electrocardiosignal to obtain electrocardiographic information of a detected object.

It is found in practical applications that a human body, as an antenna, can also be subjected to electromagnetic interference (especially the noise of the household power supply with a frequency of 50/60 Hz), and the electromagnetic interference may mask the electrocardiosignal, resulting in difficulty in measuring the electrocardiosignal. In order to eliminate common mode interference of the human body, a Driven-Right-Leg Circuit and a dry electrode (also called an irrelevant electrode) are usually provided in the electrocardiographic detection apparatus, and the Driven-Right-Leg Circuit may acquire or output a signal through the dry electrode.

With the addition of the dry electrode, the electrocardiographic detection apparatus includes at least two kinds of electrodes, i.e., the signal acquisition electrode and the dry electrode. Thus, the number of the electrodes worn by a user is increased, and comfort of user using the electrocardiographic detection apparatus is reduced.

SUMMARY

For at least solving one of the technical problems in the prior art, the present disclosure provides a signal acquisition circuit and a physiological detection apparatus.

As a first aspect, a signal acquisition circuit is provided in an embodiment of the present disclosure. The signal acquisition circuit includes at least one signal acquisition electrode, wherein each of the at least one signal acquisition electrode is provided with at least one signal acquisition branch circuit corresponding to the signal acquisition electrode, and each of at least part of the at least one signal acquisition electrodes is provided with a feedback network branch circuit. A first terminal of each of the at least one signal acquisition branch circuit is electrically connected to a corresponding signal acquisition electrode, a second terminal of each of the at least one signal acquisition branch circuit is electrically connected to a corresponding signal input terminal of a signal processing module, and each of the at least one signal acquisition branch circuit is configured to transmit a bioelectrical signal acquired by the corresponding signal acquisition electrode for physiological detection to the signal processing module. A first terminal of the feedback network branch circuit is electrically connected to the corresponding signal acquisition electrode, a second terminal of the feedback network branch circuit is electrically connected to a Driven-Right-Leg Circuit, and the feedback network branch circuit is configured to transmit a common mode interference signal acquired by the corresponding signal acquisition electrode to the Driven-Right-Leg Circuit such that the Driven-Right-Leg Circuit performs a backward process on the common mode interference signal to generate an anti-interference signal, and the feedback network branch circuit is configured to transmit the anti-interference signal output by the Driven-Right-Leg Circuit to the corresponding signal acquisition electrode.

In some embodiments, the feedback network branch circuit includes a signal input sub-circuit and a signal output sub-circuit. A first terminal of the signal input sub-circuit is electrically connected to the corresponding signal acquisition electrode, a second terminal of the signal input sub-circuit is electrically connected to a signal input terminal of the Driven-Right-Leg Circuit, and the signal input sub-circuit is configured to transmit the common mode interference signal acquired by the corresponding signal acquisition electrode to the signal input terminal of the Driven-Right-Leg Circuit. A first terminal of the signal output sub-circuit is electrically connected to the corresponding signal acquisition electrode, a second terminal of the signal output sub-circuit is electrically connected to a signal output terminal of the Driven-Right-Leg Circuit, and the signal output sub-circuit is configured to transmit the anti-interference signal output from the signal output terminal of the Driven-Right-Leg Circuit to the corresponding signal acquisition electrode.

In some embodiments, the first terminal of the signal input sub-circuit and the first terminal of the signal output sub-circuit are connected in series to the corresponding signal acquisition electrode through a same load resistor.

In some embodiments, the signal input sub-circuit includes a first resistor and a first capacitor. A first terminal of the first resistor and a first terminal of the first capacitor are both electrically connected to the corresponding signal acquisition electrode. A second terminal of the first resistor and a second terminal of the first capacitor are both electrically connected to the signal input terminal of the Driven-Right-Leg Circuit.

In some embodiments, the at least one signal acquisition electrode comprises two signal acquisition electrodes.

In some embodiments, only one of the two signal acquisition electrodes is provided with the feedback network branch circuit.

In some embodiments, each of the at least one signal acquisition electrode is provided with a static elimination circuit electrically connected to the signal acquisition electrode and configured to perform discharge electrostatic on the signal acquisition electrode.

In some embodiments, the at least one signal acquisition branch circuit provided for each signal acquisition electrode includes an electrocardiosignal acquisition branch circuit and/or a respiratory signal acquisition branch circuit. A first terminal of the electrocardiosignal acquisition branch circuit is electrically connected to the corresponding signal acquisition electrode, a second terminal of the electrocardiosignal acquisition branch circuit is electrically connected to an electrocardiosignal input terminal of the signal processing module, and the electrocardiosignal acquisition branch circuit is configured to transmit an electrocardiosignal acquired by the corresponding signal acquisition electrode to the electrocardiosignal input terminal of the signal processing module. A first terminal of the respiratory signal acquisition branch circuit is electrically connected to the corresponding signal acquisition electrode, a second terminal of the respiratory signal acquisition branch circuit is electrically connected to a respiratory signal input terminal of the signal processing module, and the respiratory signal acquisition branch circuit is configured to transmit a respiratory signal acquired by the corresponding signal acquisition electrode to the respiratory signal input terminal of the signal processing module.

In some embodiments, the electrocardiosignal acquisition branch circuit includes: a noise reduction circuit configured to perform a noise reduction process on the transmitted electrocardiosignal; and the respiratory signal acquisition branch circuit includes a high-frequency filter circuit configured to filter the transmitted respiratory signal so as to filter out an interference signal having a frequency greater than a preset frequency threshold.

In some embodiments, the electrocardiosignal acquisition branch circuit includes a second resistor and a second capacitor. A first terminal of the second resistor is electrically connected to the corresponding signal acquisition electrode, and a second terminal of the second resistor is electrically connected to the electrocardiosignal input terminal of the signal processing module. A first terminal of the second capacitor is electrically connected to the electrocardiosignal input terminal of the signal processing module, and a second terminal of the second capacitor is grounded.

In some embodiments, the respiratory signal acquisition branch circuit includes a third resistor, a fourth resistor and a third capacitor. A first terminal of the third resistor is electrically connected to an operation voltage input terminal, and a second terminal of the third resistor is electrically connected to the respiratory signal input terminal of the signal processing module. A first terminal of the fourth resistor is electrically connected to the respiratory signal input terminal of the signal processing module, and a second terminal of the fourth resistor is grounded. A first terminal of the third capacitor is electrically connected to the corresponding signal acquisition electrode, and a second terminal of the third capacitor is electrically connected to the respiratory signal input terminal of the signal processing module.

In some embodiments, in a case where the at least one signal acquisition branch circuit provided for each signal acquisition electrode includes the respiratory signal acquisition branch circuit, each signal acquisition electrode is further provided with a respiration drive signal supply branch circuit. A first terminal of the respiration drive signal supply branch circuit is electrically connected to the corresponding signal acquisition electrode, a second terminal of the respiration drive signal supply branch circuit is electrically connected to a respiration drive signal output terminal of the signal processing module, and the respiration drive signal supply branch circuit is configured to transmit a respiration drive signal output from the respiration drive signal output terminal of the signal processing module to the corresponding signal acquisition electrode.

In some embodiments, in the respiration drive signal supply branch circuit includes a fourth capacitor and a fifth resistor. A first terminal of the fourth capacitor is electrically connected to the corresponding signal acquisition electrode, and a second terminal of the fourth capacitor is electrically connected to a first terminal of the fifth resistor; and a second terminal of the fifth resistor is electrically connected to the respiration drive signal output terminal of the signal processing module.

In some embodiments, the respiratory signal acquisition branch circuit and the respiration drive signal supply branch circuit are connected to the corresponding signal acquisition electrodes through a same direct-current filter capacitor.

As a second aspect, a physiological detection device including the signal acquisition circuit described in the first aspect is provided in an embodiment of the present disclosure.

DETAIL DESCRIPTION OF EMBODIMENTS

In order to enable those skilled in the art to better understand the technical solutions of the present disclosure, a signal acquisition circuit and a physiological detection apparatus provided by the present disclosure are described in detail below with reference to the drawings.

Figure 1:
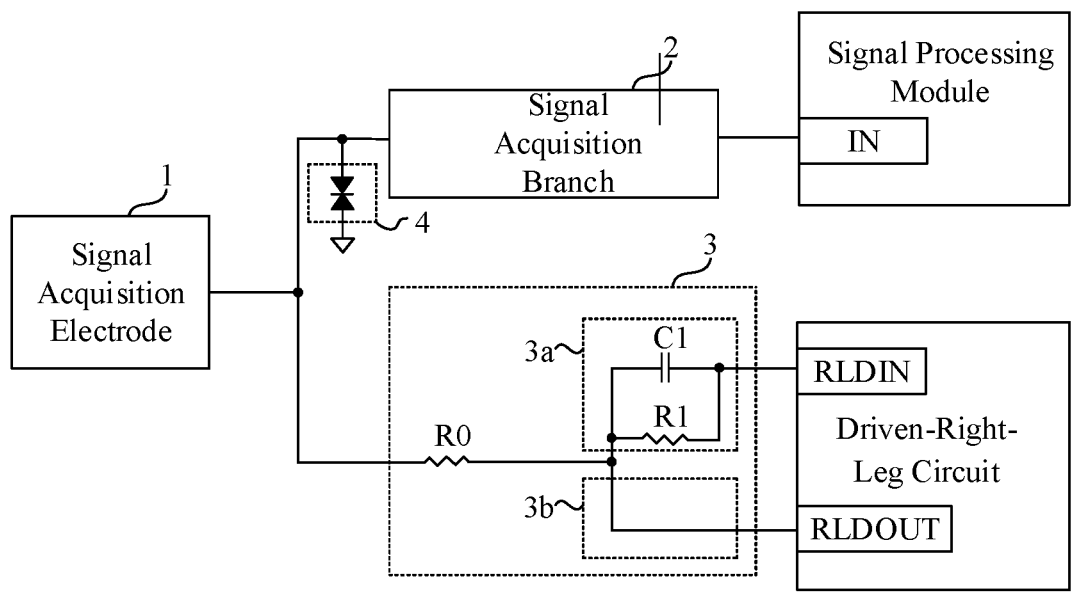
FIG. 1 is a schematic diagram showing a structure of a signal acquisition circuit according to the embodiments of the present disclosure.

FIG. 1 is a schematic diagram showing a structure of a signal acquisition circuit according to the embodiments of the present disclosure, and the signal acquisition circuit shown in FIG. 1 includes: at least one signal acquisition electrode 1; and each signal acquisition electrode 1 is provided with at least one signal acquisition branch circuit 2 corresponding to the signal acquisition electrode 1, and at least part of signal acquisition electrodes 1 each are provided with a feedback network branch circuit 3.

A first terminal of the signal acquisition branch circuit 2 is electrically connected to a corresponding signal acquisition electrode 1, and a second terminal of the signal acquisition branch circuit 2 is electrically connected to a corresponding signal input terminal IN of a signal processing module; and the signal acquisition branch circuit 2 is configured to transmit a bioelectrical signal acquired by the corresponding signal acquisition electrode 1 for physiological detection to the signal processing module.

A first terminal of the feedback network branch circuit 3 is electrically connected to the corresponding signal acquisition electrode 1, and a second terminal of the feedback network branch circuit 3 is electrically connected to a Driven-Right-Leg Circuit; the feedback network branch circuit 3 is configured to transmit a common mode interference signal acquired by the corresponding signal acquisition electrode 1 to the Driven-Right-Leg Circuit, so that the Driven-Right-Leg Circuit performs a backward process or a counter-jamming process/an anti-interference process on the common mode interference signal to generate an anti-interference signal, and the feedback network branch circuit 3 is configured to transmit the anti-interference signal output by the Driven-Right-Leg Circuit to the signal acquisition electrode 1.

It should be noted that FIG. 1 only shows one signal acquisition electrode 1 and one signal acquisition branch circuit 2 and one feedback network branch circuit 3 provided for the signal acquisition electrode 1, which is an example embodiment and does not constitute any limitation to the technical solutions of the present disclosure.

In the embodiments of the present disclosure, the Driven-Right-Leg Circuit acquires a common mode interference signal of a detected object through the signal acquisition electrode, and outputs an anti-interference signal to the detected object through the signal acquisition electrode, so that a dry electrode is not required to be provided any more, as a result, the number of the electrodes in the signal acquisition circuit can be reduced while a common-mode rejection capability of a physiological detection apparatus can be improved. Thus, the number of the electrodes worn by a user when using the physiological detection apparatus can be reduced, thereby facilitating an improvement in the comfort of the user.

In some embodiments, the feedback network branch circuit 3 includes: a signal input sub-circuit 3a and a signal output sub-circuit 3b.

A first terminal of the signal input sub-circuit 3a is electrically connected to the corresponding signal acquisition electrode 1, a second terminal of the signal input sub-circuit 3a is electrically connected to a signal input terminal RLDIN of the Driven-Right-Leg Circuit. The signal input sub-circuit 3a is configured to transmit the common mode interference signal acquired by the corresponding signal acquisition electrode 1 to the signal input terminal RLDIN of the Driven-Right-Leg Circuit.

A first terminal of the signal output sub-circuit 3b is electrically connected to the corresponding signal acquisition electrode 1, a second terminal of the signal output sub-circuit 3b is electrically connected to a signal output terminal RLDOUT of the Driven-Right-Leg Circuit. The signal output sub-circuit 3b is configured to transmit the anti-interference signal output from the signal output terminal RLDOUT of the Driven-Right-Leg Circuit to the corresponding signal acquisition electrode 1.

In some embodiments, the first terminals of the signal input sub-circuit 3a and the first terminal of the signal output sub-circuit 3b are connected in series with the corresponding signal acquisition electrode 1 through a same load resistor R0. With the arrangement of the load resistor R0, magnitude of a current in the feedback network branch circuit 3 may be restricted to protect the circuit.

In some embodiments, the signal input sub-circuit includes: a first resistor R1 and a first capacitor C1 connected in parallel; first terminals of the first resistor R1 and a first terminal of the first capacitor C1 are both electrically connected to the corresponding signal acquisition electrode 1; and second terminals of the first resistor R1 and a second terminal of the first capacitor C1 are both electrically connected to the signal input terminal RLDIN of the Driven-Right-Leg Circuit.

The first resistor R1 and the first capacitor C1 cooperate with a built-in amplifier of the Driven-Right-Leg Circuit to acquire a common mode signal from the detected object. The Driven-Right-Leg Circuit performs a backward process or an anti-interference process on the acquired common mode signal to obtain the anti-interference signal, and transmits the anti-interference signal to the signal acquisition electrode 1 through the signal output sub-circuit 3b to apply the anti-interference signal to the detected object, thereby realizing the resistance of the common mode interference.

In some embodiments, each signal acquisition electrode 1 is provided with a static elimination circuit 4; and the static elimination circuit 4 is electrically connected to a corresponding signal acquisition electrode 1. The static elimination circuit 4 is configured to discharge the static electricity on the corresponding signal acquisition electrode 1. In the embodiments of the present disclosure, interference in a detection process can be effectively eliminated by the static elimination circuit 4.

Figure 2:
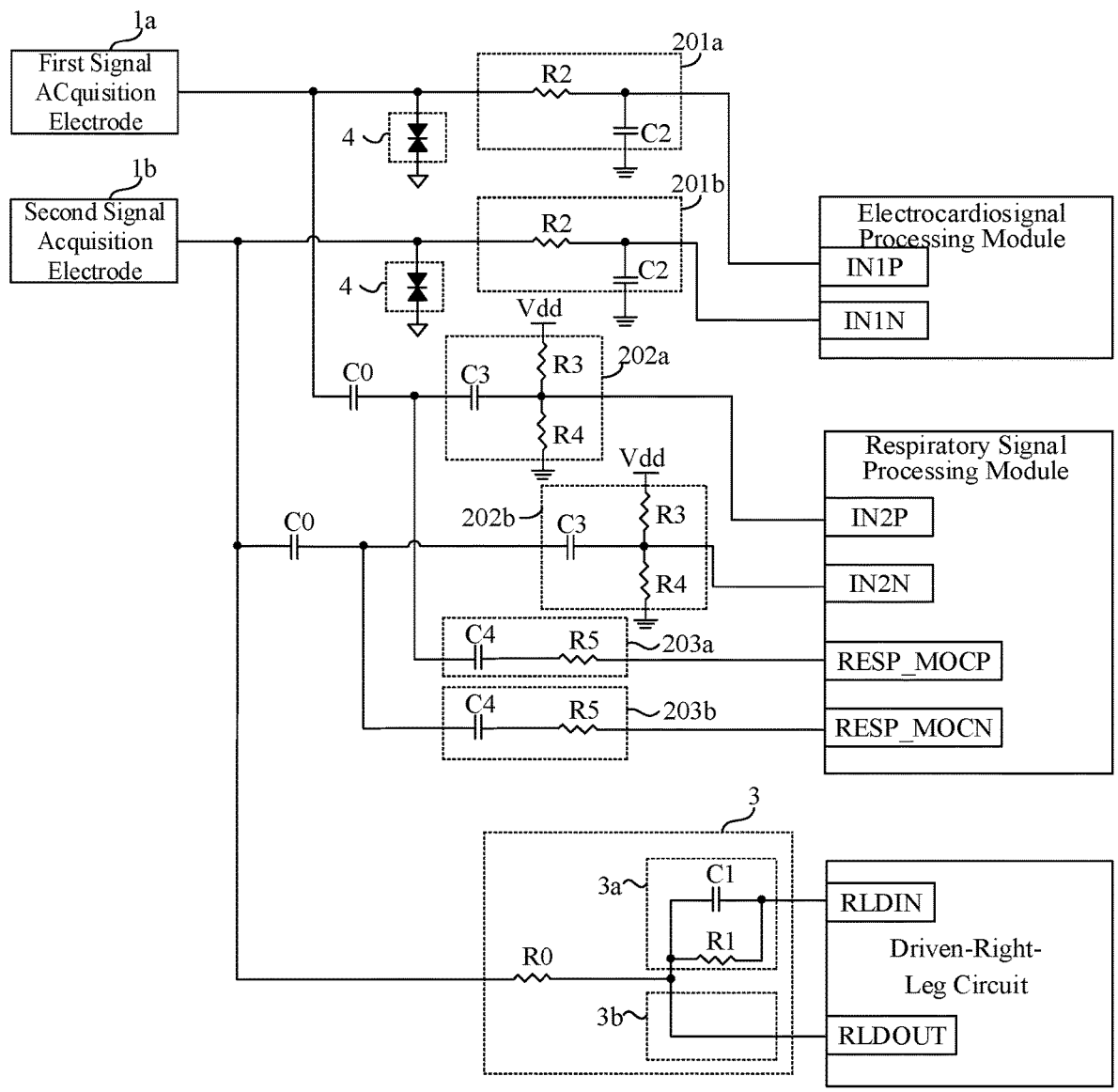
FIG. 2 is a schematic diagram showing a structure of a signal acquisition circuit according to the embodiments of the present disclosure.

FIG. 2 is a schematic diagram shows a structure of a signal acquisition circuit according to the embodiments of the present disclosure, and as shown in FIG. 2, unlike the signal acquisition circuit shown in FIG. 1, the signal acquisition circuit according to an embodiment shown in FIG. 2 includes two signal acquisition electrodes.

In practical applications, a differential signal of bioelectrical signals acquired by two different signal acquisition electrodes is generally used as an index in the field of physiological signal acquisition. Since the bioelectric signal directly acquired has a relatively small voltage, the bioelectric signal may be amplified through a differential process, so that the magnitude of the amplified signal can meet a requirement of subsequent signal processing; and the differential signal can represent a charge direction in the detected object, thereby satisfying a requirement on signals in the field of physiological signal acquisition.

In some embodiments, only one of the two signal acquisition electrodes is provided with a feedback network branch circuit.

Theoretically, the larger the number of the signal acquisition electrodes provided with the feedback network branch circuits, the higher the accuracy of a final detection result. However, it is found in practical applications that a requirement of anti-common mode interference can be met when only one signal acquisition electrode is provided with a feedback network branch circuit. Therefore, in order to reduce the complexity of the signal acquisition circuit, only one signal acquisition electrode is provided with a feedback network branch circuit in a preferred embodiment of the present disclosure.

In some embodiments, the physiological detection apparatus has an electrocardiographic detection function and a respiration detection function, and includes an electrocardiosignal processing module and a respiratory signal processing module. The electrocardiosignal processing module includes two electrocardiosignal input terminals (which are in one-to-one correspondence with the two signal acquisition electrodes), and the respiratory signal processing module includes two respiratory signal input terminals (which are in one-to-one correspondence with the two signal acquisition electrodes).

For convenience of description, the two signal acquisition electrodes are respectively referred to as a first signal acquisition electrode 1a and a second signal acquisition electrode 1b. The two electrocardiosignal input terminals are respectively referred to as a first electrocardiosignal input terminal IN1P and a second electrocardiosignal input terminal IN1N. The two respiratory signal input terminals are respectively referred to as a first respiratory signal input terminal IN2P and a second respiratory signal input terminal IN2N. The first signal acquisition electrode 1a corresponds to the first electrocardiosignal input terminal IN1P and the first respiratory signal input terminal IN2P. The second signal acquisition electrode 1b corresponds to the second electrocardiosignal input terminal IN1N and the second respiratory signal input terminal IN2N. The second signal acquisition electrode 1b is provided with the feedback network branch circuit.

Each signal acquisition electrode is provided with one electrocardiosignal acquisition branch circuit and one respiratory signal acquisition branch circuit, that is, the signal acquisition electrode is shared by electrocardiosignal acquisition and respiratory signal acquisition, which can effectively reduce the number of the signal acquisition electrodes.

For convenience of description, the electrocardiosignal acquisition branch circuit and the respiratory signal acquisition branch circuit provided for the first signal acquisition electrode 1a are respectively referred to as a first electrocardiosignal acquisition branch circuit 201a and a first respiratory signal acquisition branch circuit 202a. The electrocardiosignal acquisition branch circuit and the respiratory signal acquisition branch circuit provided for the second signal acquisition electrode are respectively referred to as a second electrocardiosignal acquisition branch circuit 201b and a second respiratory signal acquisition branch circuit 202b.

First terminals of the first electrocardiosignal acquisition branch circuit 201a/the second electrocardiosignal acquisition branch circuit 201b are electrically connected to the corresponding first signal acquisition electrode 1a/the corresponding second signal acquisition electrode 1b respectively. Second terminals of the first electrocardiosignal acquisition branch circuit 201a/the second electrocardiosignal acquisition branch circuit 201b are respectively electrically connected to the first electrocardiosignal input terminal IN1P/the second electrocardiosignal input terminal IN1N of the electrocardiosignal processing module. Each of the first electrocardiosignal acquisition branch circuit 201a/the second electrocardiosignal acquisition branch circuit 201b is configured to transmit the electrocardiosignal acquired by the first signal acquisition electrode 1a/the second signal acquisition electrode 1b to the first electrocardiosignal input terminal IN1P/the second electrocardiosignal input terminal IN1N of the electrocardiosignal processing module. The electrocardiosignal processing module processes the electrocardiosignals received through the first electrocardiosignal input terminal IN1P/the second electrocardiosignal input terminal IN1N, so as to obtain electrocardiographic information of the detected object. It should be noted that a process of processing, by the electrocardiosignal processing module, the electrocardiosignal to obtain the electrocardiographic information belongs to a conventional technique in the prior art, and thus will not be described in detail herein.

First terminals of the first respiratory signal acquisition branch circuit 202a/the second respiratory signal acquisition branch circuit 202b are respectively electrically connected to the corresponding first signal acquisition electrode 1a/the corresponding second signal acquisition electrode 1b, and second terminals of the first respiratory signal acquisition branch circuit 202a/the second respiratory signal acquisition branch circuit 201b are respectively electrically connected to the first respiratory signal input terminal IN2P/the second respiratory signal input terminal IN2N of the respiratory signal processing module. Each of the first respiratory signal acquisition branch circuit 202a/the second respiratory signal acquisition branch circuit 201b is configured to transmit a respiratory signal acquired by the first signal acquisition electrode 1a/the second signal acquisition electrode 1b to the first respiratory signal input terminal IN2P/the second respiratory signal input terminal IN2N of the respiratory signal processing module. The respiratory signal processing module processes the respiratory signals received through the first respiratory signal input terminal IN2P/the second respiratory signal input terminal IN2N, so as to obtain respiratory information of the detected object. It should be noted that a process of processing, by the respiratory signal processing module, the respiratory signal to obtain the respiratory information belongs to a conventional technique in the prior art, and thus will not be described in detail herein.

In some embodiments, each of the electrocardiosignal acquisition branch circuits 201a and 201b includes: a noise reduction circuit configured to perform a noise reduction process on the transmitted electrocardiosignals.

Each of the respiratory signal acquisition branch circuits 202a and 202b includes: a high-frequency filter circuit configured to filter the transmitted respiratory signals so as to filter out an interference signal having a frequency greater than a preset frequency threshold.

Since a signal required for the electrocardiographic detection is different from a signal required for the respiration detection, different kinds of interference are needed to be processed in transmission processes. Specifically, for the electrocardiographic detection, an electrocardiographic detection result may be significantly affected by interference from other devices and powerline interference, so that the noise reduction process needs to be performed in a transmission process of the electrocardiosignal to reduce or even eliminate the interference from the other devices and the powerline interference. For the respiration detection, a respiration detection result may be significantly affected by high-frequency signal interference, so that filtering out of high-frequency interference signal needs to be performed in a transmission process of the respiratory signal.

In some embodiments, each of the first electrocardiosignal acquisition branch circuit 201a/the second electrocardiosignal acquisition branch circuit 201b includes: a second resistor R2 and a second capacitor C2; a first terminal of the second resistor R2 is electrically connected to the corresponding first signal acquisition electrode 1a/the corresponding second signal acquisition electrode 1b, and a second terminal of the second resistor R2 is electrically connected to the first electrocardiosignal input terminal IN1P/the second electrocardiosignal input terminal IN1N of the electrocardiosignal processing module; a first terminal of the second capacitor C2 is electrically connected to the first electrocardiosignal input terminal IN1P/the second electrocardiosignal input terminal IN1N of the electrocardiosignal processing module, and a second terminal of the second capacitor C2 is grounded; and noise reduction of the transmitted electrocardiosignal may be realized through the second resistor R2 and the second capacitor C2. In some embodiments, the second resistors R2 and the second capacitors C2 included in the first electrocardiosignal acquisition branch circuit are the same as the second resistors R2 and the second capacitors C2 included in the second electrocardiosignal acquisition branch circuit.

In some embodiments, each of the first respiratory signal acquisition branch circuit 202a/the second respiratory signal acquisition branch circuit 202b includes: a third resistor R3, a fourth resistor R4 and a third capacitor C3; a first terminal of the third resistor R3 is electrically connected to an operation voltage input terminal, and a second terminal of the third resistor R3 is electrically connected to the first respiratory signal input terminal IN2P/the second respiratory signal input terminal IN2N of the respiratory signal processing module; a first terminal of the fourth resistor R4 is electrically connected to the first respiratory signal input terminal IN2P/the second respiratory signal input terminal IN2N of the respiratory signal processing module, and a second terminal of the fourth resistor R4 is grounded; and a first terminal of the third capacitor C3 is electrically connected to the corresponding first signal acquisition electrode 1a/the corresponding second signal acquisition electrode 1b, and a second terminal of the third capacitor C3 is electrically connected to the first respiratory signal input terminal IN2P/the second respiratory signal input terminal IN2N of the respiratory signal processing module. Filtering out of high-frequency interference signal for the transmitted electrocardiosignal may be realized through the third resistor R3, the fourth resistor R4 and the third capacitor C3. In some embodiments, the third resistors R3, the fourth resistors R4, and the third capacitors C3 included in the first respiratory signal acquisition branch circuit are the same as the fourth resistors R4, and the third capacitors C3 included in the second respiratory signal acquisition branch circuit.

In order to solve a technical problem that bioelectrical signals generated in a respiratory process are too weak to be directly acquired, in some embodiments of the present disclosure, in a case where the at least one signal acquisition branch circuit provided for the signal acquisition electrode includes a respiratory signal acquisition branch circuit, each signal acquisition electrode is further provided with a respiration drive signal supply branch circuit.

At this time, the respiratory signal processing module includes two respiration drive signal output terminals, which are respectively referred to as a first respiration drive signal output terminal RESP_MOCP and a second respiration drive signal output terminal RESP_MOCN. The respiration drive signal supply branch circuit provided for the first signal acquisition electrode 1a is referred to as a first respiration drive signal supply branch circuit 203a, and the respiration drive signal supply branch circuit provided for the second signal acquisition electrode 1b is referred to as a second respiration drive signal supply branch circuit 203b.

First terminals of the first respiration drive signal supply branch circuit 203a/the second respiration drive signal supply branch circuit 203b are respectively electrically connected to the corresponding first signal acquisition electrode 1a/the corresponding second signal acquisition electrode 1b, and second terminals of the first respiration drive signal supply branch circuit 203a/the second respiration drive signal supply branch circuit 203b are respectively electrically connected to the respiration drive signal output terminals RESP_MOCP and RESP_MOCN of the signal processing module. The first respiration drive signal supply branch circuit 203a/the second respiration drive signal supply branch circuit 203b is configured to transmit a respiration drive signal output from the first respiration drive signal output terminal RESP_MOCP/the second respiration drive signal output terminal RESP_MOCN of the respiratory signal processing module to the corresponding first signal acquisition electrode 1a/the corresponding second signal acquisition electrode 1b. At this time, the respiration drive signal serves as a carrier signal to facilitate acquisition of a bioelectrical signal generated by respiration of the detected object.

In some embodiments, each of the first respiration drive signal supply branch circuit 203a/the second respiration drive signal supply branch circuit 203b includes: a fourth capacitor C4 and a fifth resistor R5; a first terminal of the fourth capacitor C4 is electrically connected to the corresponding signal acquisition electrode, and a second terminal of the fourth capacitor C4 is electrically connected to a first terminal of the fifth resistor R5; and a second terminal of the fifth resistor R5 is electrically connected to the first respiration drive signal output terminal RESP_MOCP/the second respiration drive signal output terminal RESP_MOCN of the signal processing module. The fourth capacitor C4 and the fifth resistor R5 are configured to modulate the respiration drive signal output from the respiration drive signal output terminal.

In some embodiments, the respiratory signal acquisition branch circuit and the respiration drive signal supply branch circuit are connected to the corresponding signal acquisition electrode through a same direct-current filter capacitor C0. The direct-current filter capacitor C0 may filter a direct-current signal of the signal acquisition electrode, so as to improve accuracy of a detection result.

It should be noted that the above-described case where the signal acquisition circuit includes two signal acquisition electrodes, each of the signal acquisition electrodes is provided with two signal acquisition branch circuits, and the two signal acquisition branch circuits are respectively configured to acquire the electrocardiosignal and the respiratory signal is only for illustration, and does not constitute any limitation to the technical solutions of the present disclosure. None of the number of the signal acquisition electrodes, the number of the signal acquisition branch circuits provided for each signal acquisition electrode, and a type of the bioelectrical signal acquired by each signal acquisition branch circuit is limited by the embodiments of the present disclosure. For example, the number of the signal acquisition electrodes is two, and each signal acquisition electrode is provided with one signal acquisition branch circuit configured to acquire an electrocardiosignal. As another example, the number of the signal acquisition electrodes is two, and each signal acquisition electrode is provided with one signal acquisition branch circuit configured to acquire a respiratory signal. The examples will not be listed here one by one.

Figure 3:
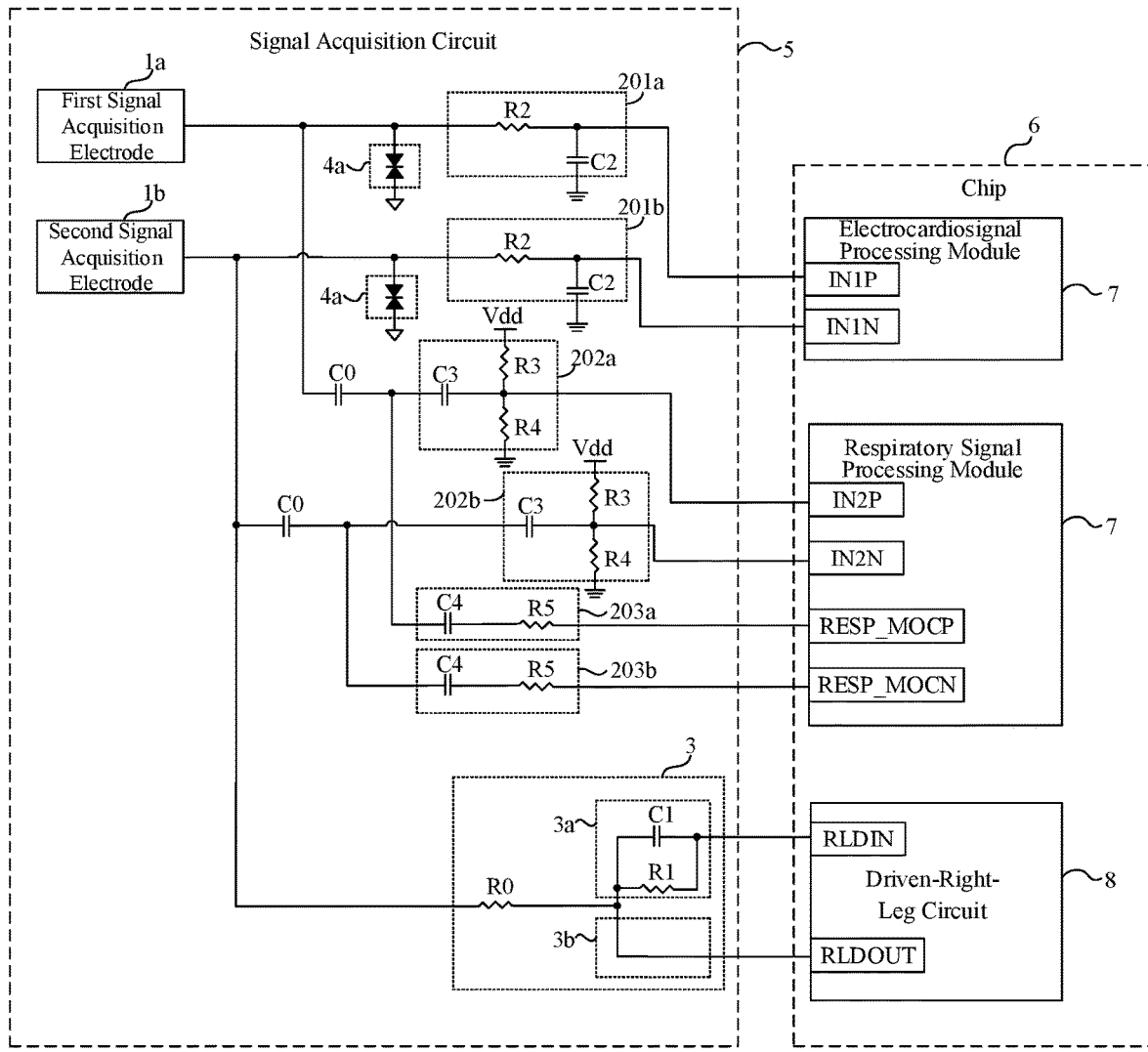
FIG. 3 is a block diagram showing a structure of a physiological detection apparatus according to the embodiments of the present disclosure.

FIG. 3 is a block diagram showing a physiological detection apparatus according to the embodiments of the present disclosure, and as shown in FIG. 3, the physiological detection apparatus includes the signal acquisition circuit 5 according to the above embodiments, and reference may be made to the description of the above embodiments for a specific description of the signal acquisition circuit 5, which is not repeated here.

In some embodiments, the physiological detection apparatus further includes a Driven-Right-Leg Circuit 8 and a signal processing module 7, and the number and types of the signal processing modules 7 may be set as actual needed. For example, when the physiological detection apparatus has an electrocardiographic detection function and a respiration detection function, the physiological detection apparatus provided with one electrocardiosignal processing module 7 and one respiratory signal processing module 7 is needed.

In some embodiments, the Driven-Right-Leg Circuit 8 and the signal processing modules 7 are integrated in a same processing chip 6, which may effectively reduce an overall size of the physiological detection apparatus.

In the embodiments of the present disclosure, the Driven-Right-Leg Circuit acquires the common mode interference signal of the detected object through the signal acquisition electrode, and outputs the anti-interference signal to the detected object through the signal acquisition electrode, so that a dry electrode is not needed any more, and the number of the electrodes in the signal acquisition circuit can be reduced while a common-mode rejection capability of the physiological detection apparatus can be improved. Thus, the number of the electrodes worn by a user when using the physiological detection apparatus can be reduced, thereby facilitating an improvement in the comfort of the user.

It should be understood that the above embodiments are merely exemplary embodiments adopted to illustrate the principle of the present disclosure, and the present disclosure is not limited thereto. Various modifications and improvements can be made by those of ordinary sill in the art without departing from the spirit and essence of the present disclosure, and those modifications and improvements are also considered to fall within the scope of the present disclosure.

What is claimed is:

1. A signal acquisition circuit, comprising: at least one signal acquisition electrode, wherein each of the at least one signal acquisition electrode is provided with at least one signal acquisition branch circuit corresponding to the signal acquisition electrode, and each of at least part of the at least one signal acquisition electrodes is provided with a feedback network branch circuit;

a first terminal of each of the at least one signal acquisition branch circuit is electrically connected to a corresponding signal acquisition electrode, a second terminal of each of the at least one signal acquisition branch circuit is electrically connected to a corresponding signal input terminal of a signal processing module, and each of the at least one signal acquisition branch circuit is configured to transmit a bioelectrical signal acquired by the corresponding signal acquisition electrode for physiological detection to the signal processing module; and a first terminal of the feedback network branch circuit is electrically connected to the corresponding signal acquisition electrode, a second terminal of the feedback network branch circuit is electrically connected to a Driven-Right-Leg Circuit, and the feedback network branch circuit is configured to transmit a common mode interference signal acquired by the corresponding signal acquisition electrode to the Driven-Right-Leg Circuit such that the Driven-Right-Leg Circuit performs a backward process on the common mode interference signal to generate an anti-interference signal, and the feedback network branch circuit is configured to transmit the anti-interference signal output by the Driven-Right-Leg Circuit to the corresponding signal acquisition electrode, wherein the at least one signal acquisition electrode comprises two signal acquisition electrodes, and only one of the two signal acquisition electrodes is provided with the feedback network branch circuit.

2. The signal acquisition circuit of claim 1, wherein the feedback network branch circuit comprises: a signal input sub-circuit and a signal output sub-circuit;

a first terminal of the signal input sub-circuit is electrically connected to the corresponding signal acquisition electrode, a second terminal of the signal input sub-circuit is electrically connected to a signal input terminal of the Driven-Right-Leg Circuit, and the signal input sub-circuit is configured to transmit the common mode interference signal acquired by the corresponding signal acquisition electrode to the signal input terminal of the Driven-Right-Leg Circuit; and a first terminal of the signal output sub-circuit is electrically connected to the corresponding signal acquisition electrode, a second terminal of the signal output sub-circuit is electrically connected to a signal output terminal of the Driven-Right-Leg Circuit, and the signal output sub-circuit is configured to transmit the anti-interference signal output from the signal output terminal of the Driven-Right-Leg Circuit to the corresponding signal acquisition electrode.

3. The signal acquisition circuit of claim 2, wherein the first terminal of the signal input sub-circuit and the first terminal of the signal output sub-circuit are connected in series to the corresponding signal acquisition electrode through a same load resistor.

4. The signal acquisition circuit of claim 2, wherein the signal input sub-circuit comprises: a first resistor and a first capacitor;

a first terminal of the first resistor and a first terminal of the first capacitor are both electrically connected to the corresponding signal acquisition electrode; and a second terminal of the first resistor and a second terminal of the first capacitor are both electrically connected to the signal input terminal of the Driven-Right-Leg Circuit.

5. The signal acquisition circuit of claim 1, wherein each of the at least one signal acquisition electrode is provided with a static elimination circuit electrically connected to the signal acquisition electrode and configured to perform discharge electrostatic on the signal acquisition electrode.

6. The signal acquisition circuit of claim 1, wherein the at least one signal acquisition branch circuit provided for each signal acquisition electrode comprises: an electrocardiosignal acquisition branch circuit and/or a respiratory signal acquisition branch circuit;

a first terminal of the electrocardiosignal acquisition branch circuit is electrically connected to the corresponding signal acquisition electrode, a second terminal of the electrocardiosignal acquisition branch circuit is electrically connected to an electrocardiosignal input terminal of the signal processing module, and the electrocardiosignal acquisition branch circuit is configured to transmit an electrocardiosignal acquired by the corresponding signal acquisition electrode to the electrocardiosignal input terminal of the signal processing module; and a first terminal of the respiratory signal acquisition branch circuit is electrically connected to the corresponding signal acquisition electrode, a second terminal of the respiratory signal acquisition branch circuit is electrically connected to a respiratory signal input terminal of the signal processing module, and the respiratory signal acquisition branch circuit is configured to transmit a respiratory signal acquired by the corresponding signal acquisition electrode to the respiratory signal input terminal of the signal processing module.

7. The signal acquisition circuit of claim 6, wherein the electrocardiosignal acquisition branch circuit comprises: a noise reduction circuit configured to perform a noise reduction process on the transmitted electrocardiosignal; and the respiratory signal acquisition branch circuit comprises: a high-frequency filter circuit configured to filter the transmitted respiratory signal so as to filter out an interference signal having a frequency greater than a preset frequency threshold.

8. The signal acquisition circuit of claim 7, wherein the electrocardiosignal acquisition branch circuit comprises: a second resistor and a second capacitor;

a first terminal of the second resistor is electrically connected to the corresponding signal acquisition electrode, and a second terminal of the second resistor is electrically connected to the electrocardiosignal input terminal of the signal processing module; and a first terminal of the second capacitor is electrically connected to the electrocardiosignal input terminal of the signal processing module, and a second terminal of the second capacitor is grounded.

9. The signal acquisition circuit of claim 7, wherein the respiratory signal acquisition branch circuit comprises: a third resistor, a fourth resistor and a third capacitor;

a first terminal of the third resistor is electrically connected to an operation voltage input terminal, and a second terminal of the third resistor is electrically connected to the respiratory signal input terminal of the signal processing module, a first terminal of the fourth resistor is electrically connected to the respiratory signal input terminal of the signal processing module, and a second terminal of the fourth resistor is grounded, and a first terminal of the third capacitor is electrically connected to the corresponding signal acquisition electrode, and a second terminal of the third capacitor is electrically connected to the respiratory signal input terminal of the signal processing module.

10. The signal acquisition circuit of claim 6, wherein, in a case where the at least one signal acquisition branch circuit provided for each signal acquisition electrode comprises the respiratory signal acquisition branch circuit, each signal acquisition electrode is further provided with a respiration drive signal supply branch circuit; and a first terminal of the respiration drive signal supply branch circuit is electrically connected to the corresponding signal acquisition electrode, a second terminal of the respiration drive signal supply branch circuit is electrically connected to a respiration drive signal output terminal of the signal processing module, and the respiration drive signal supply branch circuit is configured to transmit a respiration drive signal output from the respiration drive signal output terminal of the signal processing module to the corresponding signal acquisition electrode.

11. The signal acquisition circuit of claim 10, wherein the respiration drive signal supply branch circuit comprises: a fourth capacitor and a fifth resistor, a first terminal of the fourth capacitor is electrically connected to the corresponding signal acquisition electrode, and a second terminal of the fourth capacitor is electrically connected to a first terminal of the fifth resistor; and a second terminal of the fifth resistor is electrically connected to the respiration drive signal output terminal of the signal processing module.

12. The signal acquisition circuit of claim 10, wherein the respiratory signal acquisition branch circuit and the respiration drive signal supply branch circuit are connected to the corresponding signal acquisition electrodes through a same direct-current filter capacitor.

13. A physiological detection device, comprising the signal acquisition circuit of claim 1.

* * * * *